United States Patent
Jung et al.

(10) Patent No.: US 11,196,117 B2
(45) Date of Patent: Dec. 7, 2021

(54) APPARATUS FOR SEALING POUCH CASE

(71) Applicant: LG CHEM, LTD., Seoul (KR)

(72) Inventors: Tai-Jin Jung, Daejeon (KR); Dal-Mo Kang, Daejeon (KR); Jeong-O Mun, Daejeon (KR); Eun-Gyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 111 days.

(21) Appl. No.: 16/704,912

(22) Filed: Dec. 5, 2019

(65) Prior Publication Data

US 2020/0112001 A1    Apr. 9, 2020

Related U.S. Application Data

(63) Continuation of application No. PCT/KR2018/014868, filed on Nov. 28, 2018.

(30) Foreign Application Priority Data

Dec. 21, 2017    (KR) .......................... 10-2017-0177307

(51) Int. Cl.
*H01M 50/183*    (2021.01)
*H01M 50/116*    (2021.01)
(Continued)

(52) U.S. Cl.
CPC ....... *H01M 50/183* (2021.01); *H01M 50/116* (2021.01); *B29C 65/02* (2013.01); *B29C 65/70* (2013.01)

(58) Field of Classification Search
CPC ............. H01M 50/183; H01M 50/116; H01M 50/545; H01M 50/10; H01M 50/124;
(Continued)

(56) References Cited

U.S. PATENT DOCUMENTS 6,319,630 B1 * 11/2001 Hasegawa ............ H01M 50/116
429/162
8,697,277 B2    4/2014 Otohata et al.
(Continued)

FOREIGN PATENT DOCUMENTS

JP    2-37661 A    2/1990
JP    2004-303589 A    10/2004
(Continued)

OTHER PUBLICATIONS

International Search Report (PCT/ISA/210) issued in PCT/KR2018/014868, dated Mar. 21, 2019.
(Continued)

*Primary Examiner* — Cynthia L Schaller
(74) *Attorney, Agent, or Firm* — Birch, Stewart, Kolasch & Birch, LLP

(57) ABSTRACT

A pouch case sealing apparatus for sealing a pouch case that includes a pouch body for accommodating an electrode assembly of a battery cell and a pouch terrace extending from the pouch body is provided. The pouch case sealing apparatus includes: a pair of sealing jigs, each sealing jig having a pressing surface, the pair of sealing jigs being configured to press and thermally fuse the pouch terrace from upper and lower directions of the pouch terrace so that the pouch case is sealed; and a pair of terrace anti-protruding units formed at respective pressing surfaces of the pair of sealing jigs to prevent an end portion of the pouch terrace from protruding beyond the pouch body in a horizontal direction of the pouch body when the pouch terrace is pressed and thermally fused. A method for sealing a pouch case is also provided.

11 Claims, 8 Drawing Sheets

(51) Int. Cl.
  *B29C 65/02* (2006.01)
  *B29C 65/70* (2006.01)
(58) Field of Classification Search
  CPC ... B29C 65/02; B29C 65/70; B29C 66/83221;
    B29C 66/81422; B29C 66/81423; B29C
    66/133; B29C 66/326; B29C 66/301;
    B29C 66/4332; B29C 66/1122; B29C
    65/7841; Y02E 60/10; B29L 2031/7128;
    B29L 2031/3468; B29L 2031/7146
  See application file for complete search history.

(56) References Cited

U.S. PATENT DOCUMENTS

| | | | |
|---|---|---|---|
| 2006/0093905 A1* | 5/2006 | Kim | H01M 50/183 429/175 |
| 2014/0370372 A1 | 12/2014 | Kong | |
| 2015/0000117 A1 | 1/2015 | Cho et al. | |
| 2016/0036015 A1 | 2/2016 | Kim et al. | |
| 2016/0141709 A1 | 5/2016 | Kim et al. | |
| 2018/0175337 A1 | 6/2018 | Lee et al. | |
| 2018/0219245 A1 | 8/2018 | Choi et al. | |

FOREIGN PATENT DOCUMENTS

| | | |
|---|---|---|
| JP | 2012-018866 A | 1/2012 |
| JP | 2015-507833 A | 3/2015 |
| JP | 2018-526769 A | 9/2018 |
| KR | 10-2013-0140587 A | 12/2013 |
| KR | 10-2014-0015201 A | 2/2014 |
| KR | 10-2014-0017908 A | 2/2014 |
| KR | 10-2014-0086907 A | 7/2014 |
| KR | 10-1452021 B1 | 10/2014 |
| KR | 10-2015-0061990 A | 6/2015 |
| KR | 10-2015-0072236 A | 6/2015 |
| KR | 10-2015-0137742 A | 12/2015 |
| KR | 10-2016-0041402 A | 4/2016 |
| KR | 10-2016-0060221 A | 5/2016 |
| KR | 10-2016-0077880 A | 7/2016 |
| KR | 10-2017-0052061 A | 5/2017 |
| KR | 10-2017-0109327 A | 9/2017 |

OTHER PUBLICATIONS

Supplementarly European Search Report mailed in EP 18890949.3 dated Oct. 15, 2020.

* cited by examiner

APPARATUS FOR SEALING POUCH CASE

CROSS-REFERENCE TO RELATED APPLICATIONS

This application is a Continuation PCT International Application No. PCT/KR2018/014868, filed on Nov. 28, 2019 in the Republic of Korea, which claims priority under 35 U.S.C. 119(a) to Korean Patent Application No. 10-2017-0177307 filed on Dec. 21, 2017 in the Republic of Korea, all of which are hereby expressly incorporated by reference into the present application.

TECHNICAL FIELD

The present disclosure relates to a pouch case sealing apparatus, and more particularly, to a pouch case sealing apparatus for sealing a pouch terrace of a pouch case of a battery cell.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be greatly reduced and no byproduct is generated during energy consumption.

Secondary batteries widely used at the present include lithium ion batteries, lithium polymer batteries, nickel cadmium batteries, nickel hydrogen batteries, nickel zinc batteries and the like. An operating voltage of the secondary battery cell, namely a unit battery cell, is about 2.5V to 4.6V. Therefore, if a higher output voltage is required, a plurality of battery cells may be connected in series to provide a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

In addition, when a plurality of battery cells are connected in series or in parallel to provide a battery pack, it is common to form a battery module composed of at least one battery cell first, and then form a battery pack by using at least one battery module in addition to other components necessary for the battery pack. Here, the battery cells used in a battery module or a battery pack may be pouch-type secondary batteries that may be easily stacked on one another.

Referring to FIGS. 1 to 3, a conventional battery cell 1, which is a pouch-type secondary battery, includes an electrode assembly 10, a pouch case 50 for packaging the electrode assembly 10, and a pair of electrodes lead 70 protruding out of the pouch case 50 and electrically connected to the electrode assembly 10.

In this arrangement, the pouch case 50 includes a pouch body 52 having an accommodation space for accommodating the electrode assembly 10, and a pouch terrace 56 extending from the pouch body 52 and thermally fused by using a pouch case sealing device 5 for sealing the pouch case 50.

The conventional pouch sealing device 5 is configured to include a pair of sealing jigs to seal four side surfaces or three side surfaces of the pouch case 50. In recent years, three-surface sealing where only three side surfaces among four side surfaces of the pouch body 52 are sealed is increasing in use to secure the capacity of the battery cell 1 and improve space utilization. The conventional pouch sealing device 5 seals the pouch case 50 while the pair of sealing jigs press and thermally fuse the pouch terrace 56.

However, when the pouch case 50 of the battery cell 1 is sealed by using the conventional pouch sealing device 5, as shown in FIG. 3, at least one end portion of the pouch terrace 56 is compressed due to pressing and thus protrudes by a predetermined distance b beyond one side surface of the pouch body 52, which is a non-sealed side surface in a horizontal direction when viewed from above.

Since the protruding portion b of the pouch terrace 56 is disposed in the form of a protruding burr, it acts as a factor forming an unnecessary dead space when forming a battery module or a battery pack, thereby lowering an energy density or deteriorating the efficiency of the assembling process.

DISCLOSURE

Technical Problem

The present disclosure is directed to providing a pouch case sealing apparatus, which may prevent an end portion of a pouch terrace from protruding beyond a non-sealing surface when a pouch case of a battery cell is sealed.

In addition, the present disclosure is directed to providing a pouch case sealing apparatus, which may increase an energy density of the battery cell.

Moreover, the present disclosure is directed to providing a pouch case sealing apparatus, which may enhance the efficiency of the assembling process.

Technical Solution

In one aspect of the present disclosure, there is provided a pouch case sealing apparatus for sealing a pouch case that includes a pouch body for accommodating an electrode assembly of a battery cell and a pouch terrace extending from the pouch body, the pouch case sealing apparatus comprising: a pair of sealing jigs, each sealing jig having a pressing surface, the pair of sealing jigs being configured to press and thermally fuse the pouch terrace from upper and lower directions relative to the pouch terrace so that the pouch case is sealed; and a pair of terrace anti-protruding units formed at respective pressing surfaces of the pair of sealing jigs to prevent an end portion of the pouch terrace from protruding beyond the pouch body in a horizontal direction of the pouch body when the pouch terrace is pressed and thermally fused.

The terrace anti-protruding units may include: an anti-protruding guide projection configured to protrude with a slope from the pressing surface of a first sealing jig of the pair of sealing jigs; and an anti-protruding guide groove having a shape corresponding to the anti-protruding guide projection and formed at the pressing surface of a second sealing jig of the pair of sealing jigs.

When the pair of sealing jigs press and thermally fuse the pouch terrace, the anti-protruding guide projection and the anti-protruding guide groove are configured to be engaged with the end portion of the pouch terrace such that the pouch terrace is interposed therebetween thereby bending the end portion of the pouch terrace in at least one of upper and lower directions of the pouch body.

The anti-protruding guide projection and the anti-protruding guide groove may be provided at first end portions of the pressing surfaces of the pair of sealing jigs, respectively.

The anti-protruding guide projection and the anti-protruding guide groove may have a triangular cross-section, a square cross-section or a semi-circular cross-section.

The anti-protruding guide projection may include a first inclined surface extending downward from the pressing surface of the first sealing jig, a second inclined surface extending upward from the first inclined surface, and a guide surface extending horizontally from the second inclined surface.

The anti-protruding guide groove may include a first inclined surface extending downward from the pressing surface of the second sealing jig, a second inclined surface extending upward from the first inclined surface, and a guide surface extending horizontally from the second inclined surface.

The terrace anti-protruding units may be formed integrally with the respective pressuring surfaces of the pair of sealing jigs.

The pair of sealing jigs may be configured to seal the pouch case on at least three side surfaces thereof.

In another aspect of the present disclosure, there is provided a method of sealing a terrace of a pouch case a that includes a pouch body for accommodating an electrode assembly of a battery cell and a pouch terrace extending from the pouch body, the method comprising: providing the pouch case sealing apparatus described above; placing the battery cell between the pair of sealing jigs; and pressing and thermally fusing the pouch terrace from upper and lower directions of relative to the pouch terrace by the pair of sealing jigs.

Advantageous Effects

According to various embodiments as above, it is possible to provide a pouch case sealing apparatus, which may prevent an end portion of a pouch terrace from protruding toward a non-sealing surface when a pouch case of a battery cell is sealed.

In addition, according to various embodiments as above, it is possible to provide a pouch case sealing apparatus, which may increase an energy density of the battery cell.

Moreover, according to various embodiments as above, it is possible to provide a pouch case sealing apparatus, which may enhance the efficiency of the assembling process.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to scale, and the dimensions of some components may be exaggerated.

Figure 1:
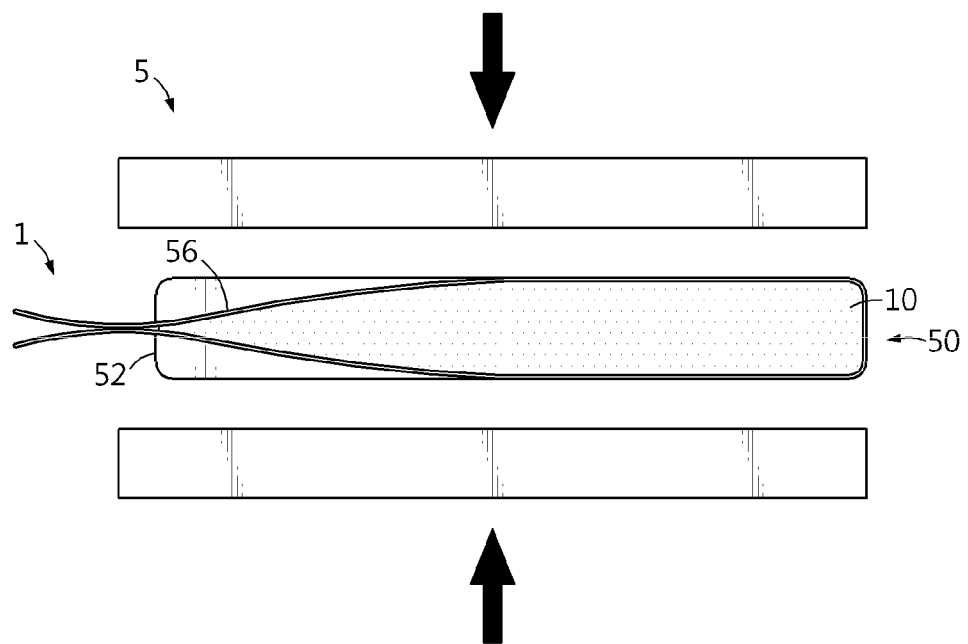
FIGS. 1 to 3 are diagrams for illustrating a process of sealing a pouch case of a battery cell by using a conventional pouch case sealing device.
Figure 2:
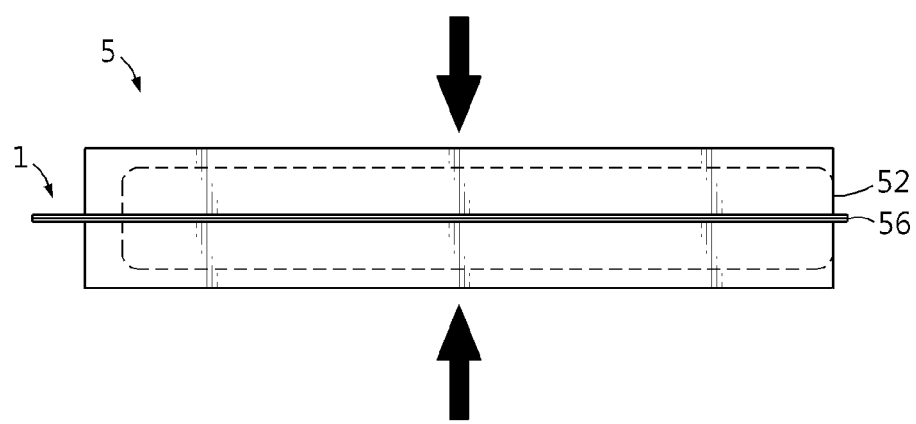
Figure 3:
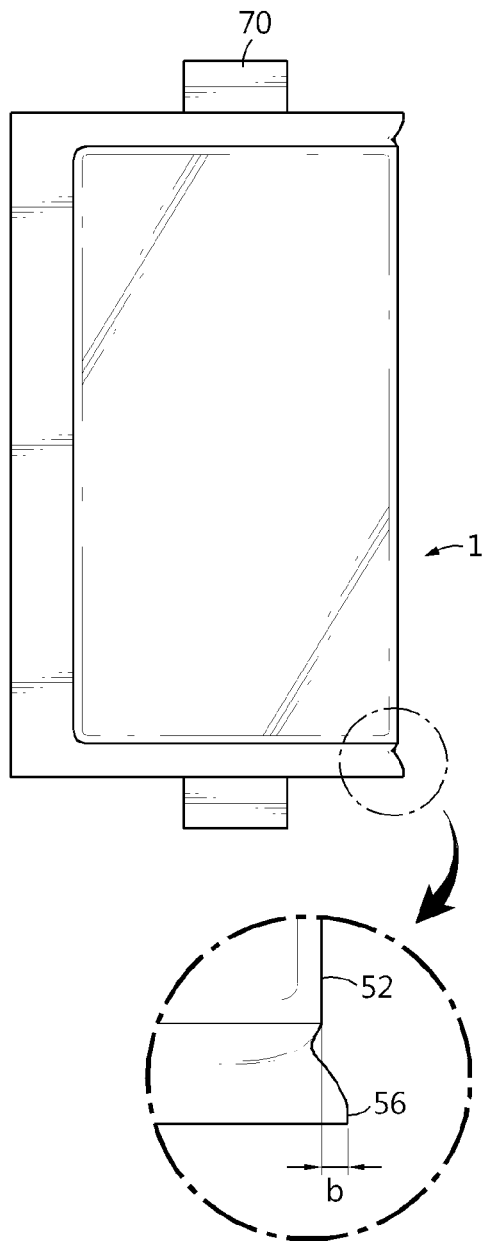
Figure 4:
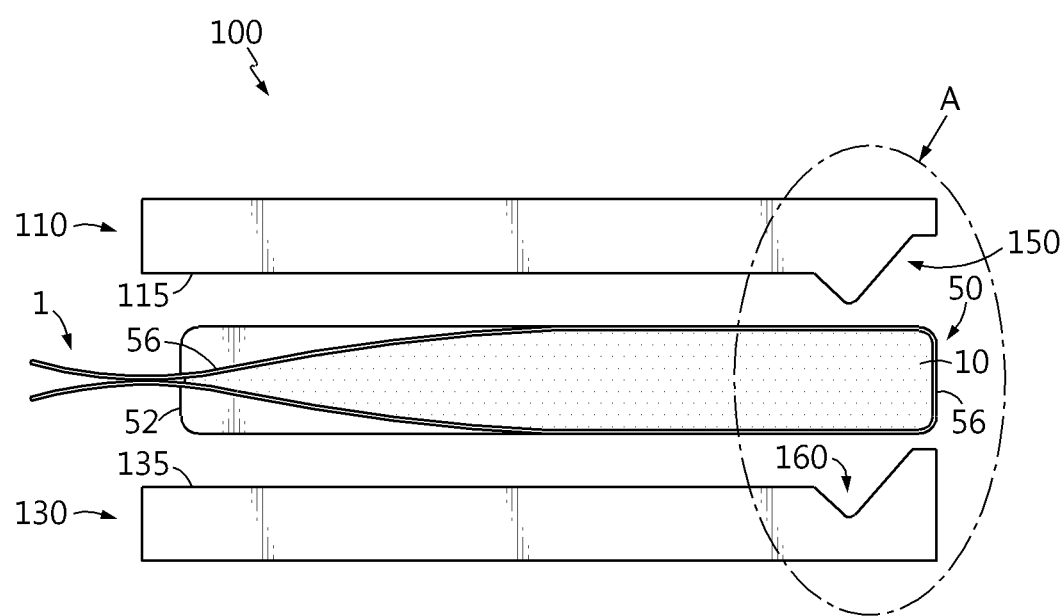
FIGS. 4 and 5 are diagrams for illustrating a pouch case sealing apparatus according to an embodiment of the present disclosure.
Figure 5:
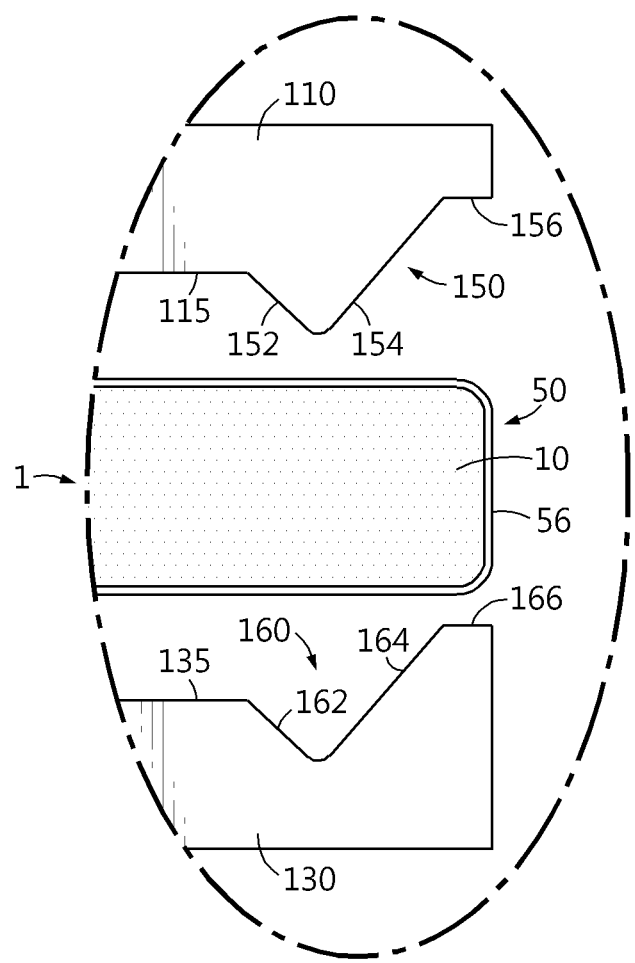

FIGS. 4 and 5 are diagrams for illustrating a pouch case sealing apparatus according to an embodiment of the present disclosure.

Referring to FIGS. 4 and 5, the pouch case sealing apparatus 100 is for sealing a pouch case 50, which includes a pouch body 52 for accommodating an electrode assembly 10 of a battery cell 1 and a pouch terrace 56 extending from the pouch body 52. The pouch case sealing apparatus 100 may seal four side surfaces or three side surfaces of the pouch case 50. That is, the pouch case 50 of the battery cell 1 may be sealed on at least three side surfaces.

Hereinafter, this embodiment will be described based on an arrangement where the pouch case sealing apparatus 100 performs three-surface sealing that seals only three side surfaces among four side surfaces of the pouch body 52 to secure the capacity of the battery cell 1 and improve space utilization.

The pouch case sealing apparatus 100 may include a pair of sealing jigs 110, 130 and a pair of terrace anti-protruding units 150, 160. In addition to these components, the pouch case sealing apparatus 100 may further include other components for sealing the pouch case 50 such as a jig lifting unit and a jig driving unit.

The pair of sealing jigs 110, 130 may press and thermally fuse the pouch terrace 56 in upper and lower directions of the pouch case 50 so that the pouch case 50 is sealed.

The pair of sealing jigs 110, 130 may have pressing surfaces 115, 135, respectively, that press the pouch terrace 56 in a pressing direction towards the pouch terrace 56.

The terrace anti-protruding units 150, 160 are formed at the pressing surfaces 115, 135 of the pair of sealing jigs 110, 130, respectively. When the pouch terrace 56 is thermally fused due to applied pressure via the sealing jigs 110, 130, the terrace anti-protruding units 150, 160 may prevent an end portion of the pouch terrace 56 from protruding beyond the non-sealed surface of the pouch body 52 in a horizontal direction of the pouch body 52 when viewed from above. The terrace anti-protruding units 150, 160 may be integrally formed at the pressing surfaces 115, 135, respectively.

The pair of terrace anti-protruding units 150, 160 may include an anti-protruding guide projection 150 and an anti-protruding guide groove 160.

By way of example, the anti-protruding guide projection 150 may be formed at one of the sealing jigs 110, 130 and the anti-protruding guide groove 160 may be formed at the other of the sealing jigs 110, 130. For example, the anti-protruding guide projection 150 may be formed at the sealing jig 110 that is disposed at an upper side among the pair of sealing jigs 110, 130, and the anti-protruding guide groove 160 may be formed at the sealing jig 130 that is disposed at a lower side among the pair of sealing jigs 110, 130. On the contrary, it is also possible that the anti-protruding guide groove is formed at the sealing jig disposed at the upper side and the anti-protruding guide projection is formed at the sealing jig disposed at the lower side.

The anti-protruding guide projection 150 may protrude with a slope from the pressing surface 115 of sealing jig 110. The anti-protruding guide projection 150 is formed with a substantially triangular shape and may be provided at one end portion of the pressing surface 115 of the sealing jig 110.

When the pair of sealing jigs 110, 130 press and thermally fuse the pouch terrace 56, the anti-protruding guide projection 150 may be engaged with the anti-protruding guide groove 160 with an end portion of the pouch terrace 56 being interposed therebetween, to bend the end portion of the pouch terrace 56 in at least one of upper and lower directions of the pouch body 52.

The anti-protruding guide projection 150 may include a first inclined surface 152, a second inclined surface 154, and a guide surface 156.

The first inclined surface 152 may protrude downward from the pressing surface 115 of the any one sealing jig 110. Here, when the pair of sealing jigs 110, 130 press the pouch case 50, the first inclined surface 152 may extend in the vertical direction of the pouch case 50 of the battery cell 1 a distance that does not exceed a bottom portion of the pouch body 52. If the first inclined surface 152 were to extend beyond the bottom portion of the pouch body 52, the pouch terrace 56 may protrude beyond the bottom portion of the pouch body 52 in the vertical direction of the pouch case 50 after the pouch case 50 is sealed.

The second inclined surface 154 may extend upward with a slope from the first inclined surface 152. The second inclined surface 154 may be formed longer than the first inclined surface 152 to secure a bending space.

The second inclined surface 154 may extend in the vertical direction of the pouch case 50 of the battery cell 1 to a height that does not exceed a top portion of the pouch body 52. If the second inclined surface 154 were to extend further, the pouch terrace 56 may protrude beyond the top portion of the pouch body 52 in the vertical direction of the pouch case 50 after the pouch case 50 is sealed.

The guide surface 156 may extend from the second inclined surface 154 along the horizontal direction of the sealing jig 110. The guide surface 156 may also prevent the pouch terrace 56 from protruding beyond the top portion of the pouch body 52 when the pouch case 50 is sealed.

Moreover, by extending horizontally from the second inclined surface 154, the guide surface 156 may additionally prevent the pouch terrace 56 from protruding beyond the non-sealed side of the pouch body 52 in the horizontal direction of the pouch case 50 when viewed from above.

The anti-protruding guide groove 160 has a shape corresponding to the anti-protruding guide projection 150 and may be formed at the pressing surface 135 of the sealing jig 130.

The anti-protruding guide groove 160 may have a triangular shape corresponding to the anti-protruding guide projection 150, and may be provided at one end portion of the pressing surface 135 of the sealing jig 130.

When the pair of sealing jigs 110, 130 press and thermally fuse the pouch terrace 56, the anti-protruding guide groove 160 is engaged with the anti-protruding guide projection 150 with the end portion of the pouch terrace 56 being interposed therebetween, and the end portion of the pouch body 52 is bent in at least one of the upper and lower directions of the pouch body 52.

The anti-protruding guide groove 160 may include a first inclined surface 162, a second inclined surface 164, and a guide surface 166.

The first inclined surface 162 is inclined downward from the pressing surface 135 of the sealing jig 130 and may be formed at a position corresponding to the first inclined surface 152 of the anti-protruding guide projection 150 in the vertical direction of the sealing jig 130.

The first inclined surface 162 is formed to have a depth that does not exceed the bottom portion of the pouch body 52 in the vertical direction of the pouch case 50 of the battery cell 1 when the pair of sealing jigs 110, 130 press the pouch case 50. If the first inclined surface 162 were to have a greater depth, the pouch terrace 56 may protrude beyond the bottom portion of the pouch body 52 in the vertical direction of the pouch case 50 after the pouch case 50 is sealed.

The second inclined surface 164 extends upward with a slope from the first inclined surface 162 and may be formed at a position corresponding to the second inclined surface 154 of the anti-protruding guide projection 150 in the vertical direction of the sealing jig 130. The second inclined surface 164 may be formed longer than the first inclined surface 162 to secure a bending space.

The second inclined surface 164 may extend to a height that does not exceed the top portion of the pouch body 52 in the vertical direction of the pouch case 50 of the battery cell 1. If the second inclined surface 164 were to extend further, the pouch terrace 56 may protrude beyond the top portion of the pouch body 52 in the vertical direction of the pouch case 50 after the pouch case 50 is sealed.

The guide surface 166 extends from the second inclined surface 164 along the horizontal direction of the sealing jig 130 and may be formed at a position corresponding to the guide surface 156 of the anti-protruding guide projection 150.

The guiding surface 166 together with the guiding surface 156 of the anti-protruding guiding projection 150 may prevent the pouch terrace 56 from protruding beyond the top portion of the pouch body 52 when the pouch case 50 is sealed.

Moreover, by extending horizontally from the second inclined surface 164, the guide surface 166 together with the guide surface 156 of the anti-protruding guide projection 150 may additionally prevent the pouch case 50 from protruding beyond the non-sealed side surface of the pouch body 52 in the horizontal direction.

Figure 6:
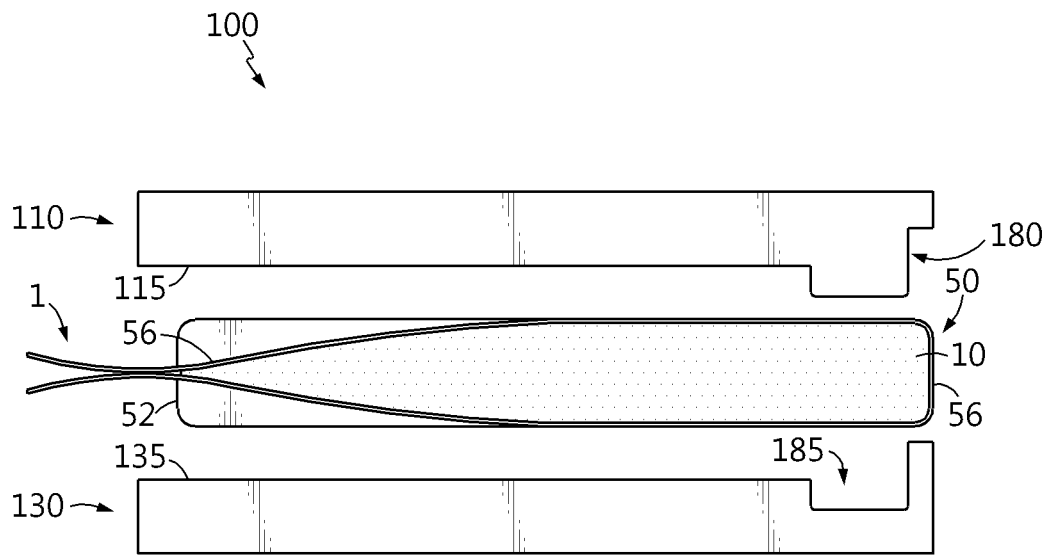
FIGS. 6 and 7 are diagrams for illustrating terrace anti-protruding unit of the pouch case sealing apparatus according to various embodiments of the present disclosure.
Figure 7:
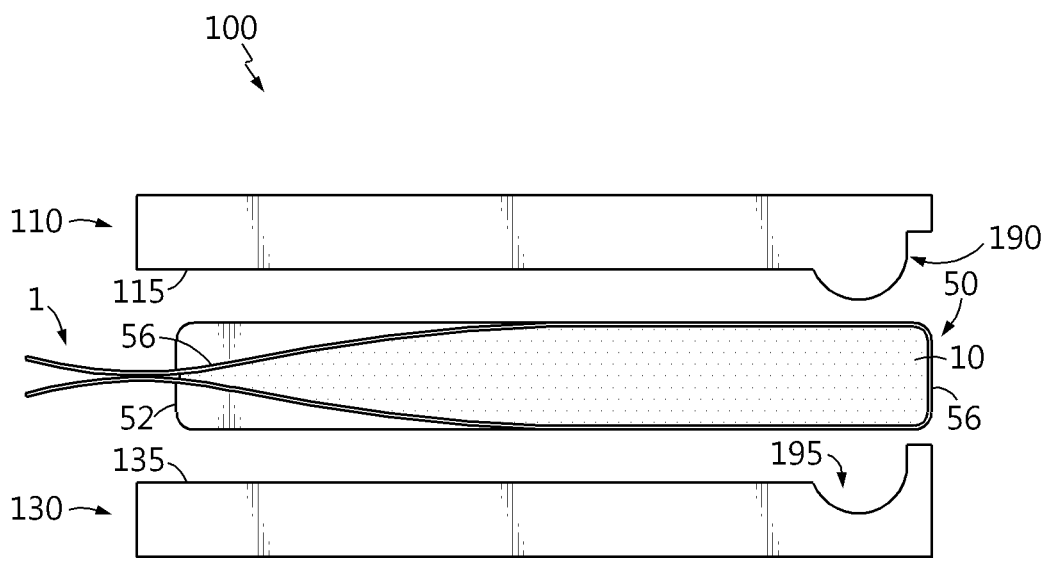

FIGS. 6 and 7 are diagrams for illustrating terrace anti-protruding units of the pouch case sealing apparatus according to alternative embodiments of the present disclosure.

Referring to FIG. 6, the terrace anti-protruding units 180, 185 may include an anti-protruding guide projection 180 and an anti-protruding guide groove 185. The anti-protruding guide projection 180 and the anti-protruding guide groove 185 have complimentary square shaped cross-sections.

Referring to FIG. 7, the terrace anti-protruding units 190, 195 may include an anti-protruding guide projection 190 and an anti-protruding guide groove 195. The anti-protruding guide projection 190 and the anti-protruding guide groove 195 have complimentary semi-circular shaped cross-sections.

As such, cross-section shape of the terrace anti-protruding units may be a triangular shape, a square shape, or a semi-circular shape, so long as they can prevent the pouch terrace 56 from protruding in an unsatisfactory manner. In addition, the embodiments of the present disclosure are not limited to such shapes, and other shapes, for example, a trapezoidal shape or the like, which can prevent the pouch terrace 56 from protruding, may be possible.

Hereinafter, the detailed operations of the pouch case sealing apparatus 100 according to an embodiment of the present disclosure will be described in more detail.

FIGS. 8 to 12 are diagrams for illustrating operations of the pouch case sealing apparatus of FIG. 4.

Figure 8:
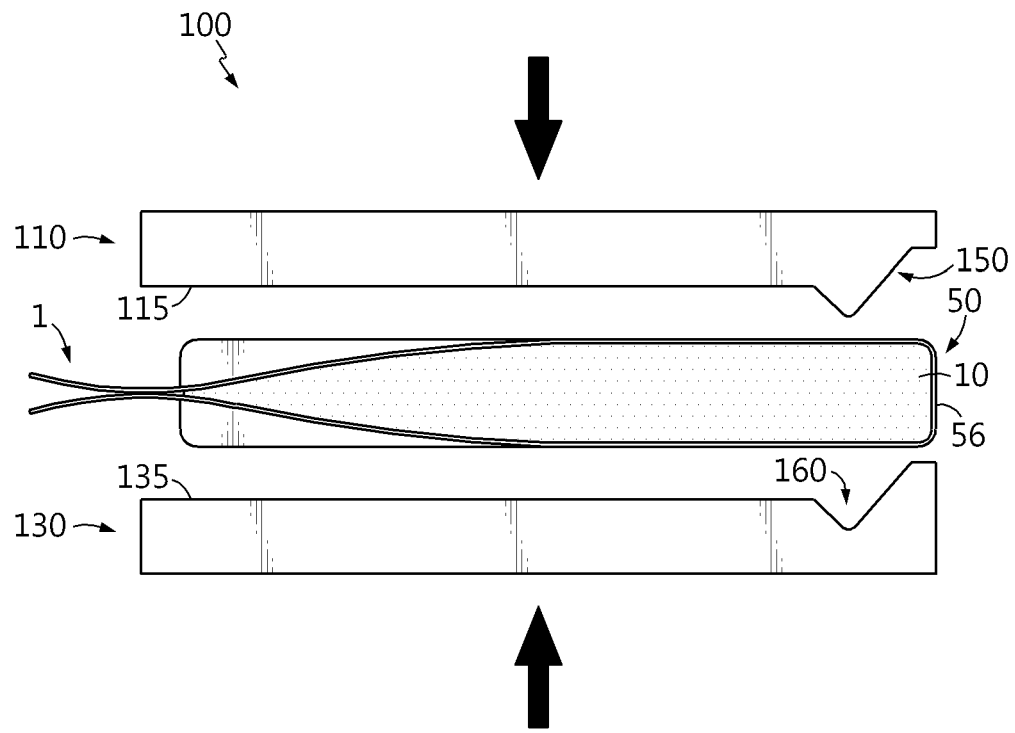
FIGS. 8 to 12 are diagrams for illustrating operations of the pouch case sealing apparatus of FIG. 4.
Figure 9:
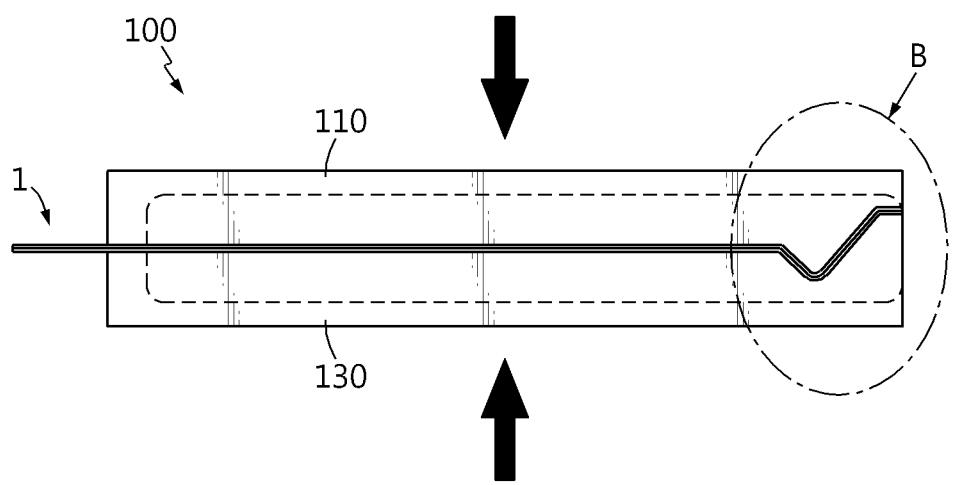

Referring to FIGS. 8 and 9, the pouch case sealing apparatus 100 may press the pouch terrace 56 by means of the pair of sealing jigs 110, 130 to seal the pouch case 50 of the battery cell 1. In this arrangement one or both sealing jigs 110, 130 are movable to press the pouch terrace therebetween.

Figure 10:
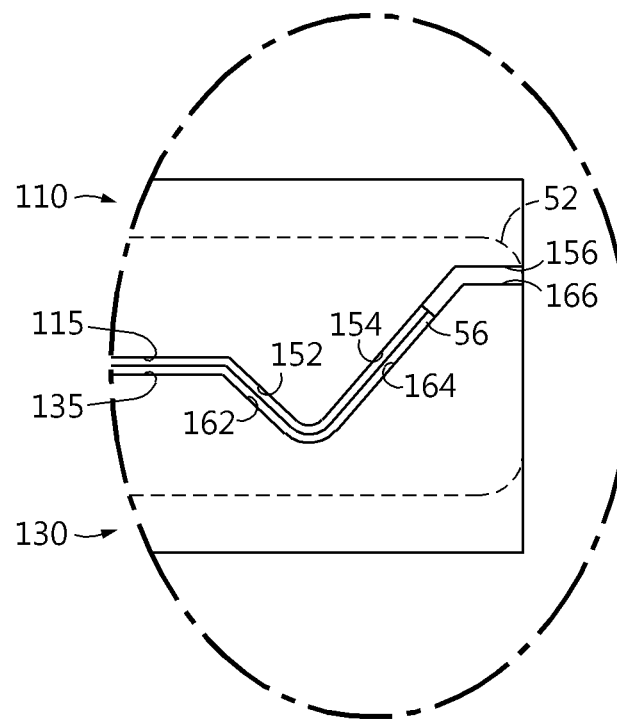
Figure 11:
Figure 12:
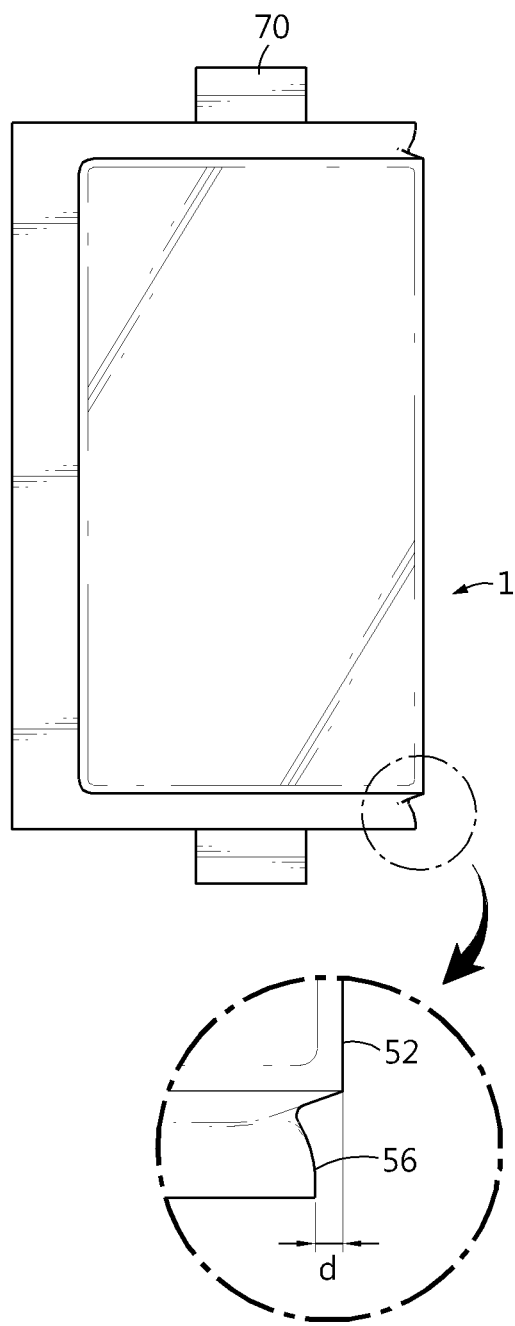

Referring to FIGS. 10 to 12, at this time, the terrace anti-protruding units 150, 160 may bend the end portion of the pouch terrace 56. Accordingly, the end portion of the pouch terrace 56 may be disposed so as to not to exceed the end portion of the pouch body 52 in the horizontal direction of the pouch case 50. Specifically, based on a non-sealing surface of the pouch body 52 where the pouch body 52 is not sealed, the end portion of the pouch terrace 56 may be disposed inwards from the non-sealing surface of the pouch body 52 (at a left side in the figures) by a predetermined distance d in the horizontal direction of the pouch case 50, due to the bending of the terrace 56.

Thus, the pouch case sealing apparatus 100 according to this embodiment may prevent the end portion of the pouch terrace 56 from protruding beyond the non-sealing surface side when the pouch case 50 of the battery cell 1 is sealed.

Accordingly, the pouch case sealing apparatus 100 according to this embodiment may remarkably increase the energy density of the battery cell 1 because a dead space conventionally caused by a protruding burr is not formed.

Moreover, the pouch case sealing apparatus 100 according to this embodiment does not cause interference with neighboring components or the like which may be conventionally generated by a protruding burr, and thus it is possible to greatly improve the efficiency of the assembling process for the battery cell 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A pouch case sealing apparatus for sealing a pouch case that includes a pouch body for accommodating an electrode assembly of a battery cell and a pouch terrace extending from the pouch body, the pouch case sealing apparatus comprising:
    a pair of sealing jigs, each sealing jig having a pressing surface, the pair of sealing jigs being configured to press and thermally fuse the pouch terrace from upper and lower directions relative to the pouch terrace so that the pouch case is sealed; and
    a pair of terrace anti-protruding units formed at respective pressing surfaces of the pair of sealing jigs to prevent an end portion of the pouch terrace from protruding beyond the pouch body in a horizontal direction of the pouch body when the pouch terrace is pressed and thermally fused, the pair of terrace anti-protruding units including:
    an anti-protruding guide projection configured to protrude with a slope from the pressing surface of a first sealing jig of the pair of sealing jigs; and
    an anti-protruding guide groove having a shape corresponding to the anti-protruding guide projection and formed at the pressing surface of a second sealing jig of the pair of sealing jigs such that the anti-protruding guide projection fits within the anti-protruding guide groove.

2. The pouch case sealing apparatus according to claim 1, wherein, when the pair of sealing jigs press and thermally fuse the pouch terrace, the anti-protruding guide projection and the anti-protruding guide groove are configured to be engaged with the end portion of the pouch terrace such that the pouch terrace is interposed therebetween, thereby bending the end portion of the pouch terrace in at least one of upper and lower directions of the pouch body.

3. The pouch case sealing apparatus according to claim 1, wherein the anti-protruding guide projection and the anti-protruding guide groove are provided at first end portions of the pressing surfaces of the pair of sealing jigs, respectively.

4. The pouch case sealing apparatus according to claim 1, wherein the anti-protruding guide projection and the anti-protruding guide groove each have a triangular cross-section.

5. The pouch case sealing apparatus according to claim 1, wherein the anti-protruding guide projection and the anti-protruding guide groove each have a square cross-section.

6. The pouch case sealing apparatus according to claim 1, wherein the anti-protruding guide projection and the anti-protruding guide groove each have a semi-circular cross-section.

7. The pouch case sealing apparatus according to claim 1, wherein the anti-protruding guide projection includes a first inclined surface extending downward from the pressing surface of the first sealing jig, a second inclined surface extending upward from the first inclined surface, and a guide surface extending horizontally from the second inclined surface.

8. The pouch case sealing apparatus according to claim 1, wherein the anti-protruding guide groove includes a first inclined surface extending downward from the pressing surface of the second sealing jig, a second inclined surface extending upward from the first inclined surface, and a guide surface extending horizontally from the second inclined surface.

9. The pouch case sealing apparatus according to claim 1, wherein the terrace anti-protruding units are formed integrally with the respective pressing surfaces of the pair of sealing jigs.

10. The pouch case sealing apparatus according to claim 1, wherein the pair of sealing jigs are configured to seal the pouch case at least three side surfaces thereof.

11. A method of sealing a terrace of a pouch case a that includes a pouch body for accommodating an electrode assembly of a battery cell and a pouch terrace extending from the pouch body, the method comprising:
    providing the pouch case sealing apparatus of claim 1;
    placing the battery cell between the pair of sealing jigs; and
    pressing and thermally fusing the pouch terrace from upper and lower directions of relative to the pouch terrace by the pair of sealing jigs.

* * * * *